US008757143B2

(12) United States Patent
Edens et al.

(10) Patent No.: US 8,757,143 B2
(45) Date of Patent: Jun. 24, 2014

(54) SOLAR POWERED FURNACE AND FURNACE ARRAY

(76) Inventors: Jason W. Edens, Backus, MN (US);
Barbara Jean Allen, Backus, MN (US);
Sarah J. Hayden, Backus, MN (US);
Graham S. Wright, Pine River, MN (US)

( * ) Notice: Subject to any disclaimer, the term of this patent is extended or adjusted under 35 U.S.C. 154(b) by 1357 days.

(21) Appl. No.: 12/491,717

(22) Filed: Jun. 25, 2009

(65) Prior Publication Data

US 2010/0051019 A1 Mar. 4, 2010

Related U.S. Application Data

(60) Provisional application No. 61/092,292, filed on Aug. 27, 2008.

(51) Int. Cl.
*F24J 2/44* (2006.01)
(52) U.S. Cl.
USPC ............ 126/634; 126/906; 126/680; 126/712
(58) Field of Classification Search
USPC ......... 126/634, 712, 680, 600, 646, 569, 621, 126/658, 906; 285/231, 345, 374, 215, 216, 285/217; 52/173.3
See application file for complete search history.

(56) References Cited

U.S. PATENT DOCUMENTS

| 2,680,437 A | 6/1954 | Miller |
| 2,680,565 A | 6/1954 | Lof |
| 3,412,728 A * | 11/1968 | Thomason ............... 126/620 |
| 3,902,474 A | 9/1975 | Pyle |
| 3,939,818 A | 2/1976 | Hamilton et al. |
| 3,996,918 A * | 12/1976 | Quick ..................... 126/649 |
| 4,029,258 A | 6/1977 | Groth |
| 4,043,317 A | 8/1977 | Scharfman |
| 4,062,346 A | 12/1977 | Rapp, Jr. et al. |
| 4,073,283 A * | 2/1978 | Lof .......................... 126/704 |
| 4,108,155 A | 8/1978 | Koizumi et al. |
| 4,144,871 A | 3/1979 | Porter |
| 4,150,660 A | 4/1979 | Peters et al. |
| 4,169,459 A | 10/1979 | Ehrlich |
| 4,170,220 A | 10/1979 | Smith |
| 4,219,012 A | 8/1980 | Bergen |
| 4,252,103 A * | 2/1981 | Carter et al. ............. 126/706 |
| 4,269,173 A * | 5/1981 | Krueger et al. .......... 126/634 |
| 4,278,072 A * | 7/1981 | Ryan et al. ............... 126/632 |

(Continued)

OTHER PUBLICATIONS

Online Google Search: "Rurar Renewable Energy Alliance" date restricted prior to Aug. 26, 2007.*

(Continued)

*Primary Examiner* — Avinash Savani
*Assistant Examiner* — Deepak Deean
(74) *Attorney, Agent, or Firm* — Shumaker & Sieffert, P.A.

(57) ABSTRACT

In some examples, a first solar powered furnace may be fluidically coupled to a second solar powered furnace by an array interconnect, which may include a first receiver, a second receiver, and an array interconnect stent that is at least partially inserted into each of the first and second receivers. In some examples, a solar powered furnace may include a back pass air channel defined by a duct floor and a solar absorption plate, and a distance between the duct floor and the solar absorption plate and a flow rate of air may be selected such that air flows through the back pass air channel in a laminar flow regime.

14 Claims, 11 Drawing Sheets

(56) References Cited

U.S. PATENT DOCUMENTS

| | | | | |
|---|---|---|---|---|
| 4,291,683 | A | * | 9/1981 | Bayles ............................ 126/623 |
| 4,297,990 | A | | 11/1981 | Allisbaugh |
| 4,312,325 | A | * | 1/1982 | Voges et al. .................... 126/588 |
| 4,312,328 | A | | 1/1982 | Leyman, III |
| 4,323,054 | A | * | 4/1982 | Hummel ........................ 126/631 |
| 4,324,232 | A | * | 4/1982 | Quiroz ............................ 126/633 |
| 4,473,063 | A | * | 9/1984 | Mackensen .................... 126/591 |
| 4,478,210 | A | | 10/1984 | Sieradski |
| 4,514,914 | A | | 5/1985 | Kitzmiller |
| 5,299,839 | A | * | 4/1994 | Mogavero ...................... 285/110 |
| 5,596,981 | A | | 1/1997 | Soucy |
| 5,649,712 | A | * | 7/1997 | Ekholm ......................... 277/607 |
| 6,322,111 | B1 | * | 11/2001 | Brady ............................ 285/370 |
| 2002/0153725 | A1 | * | 10/2002 | Myers ............................ 285/370 |
| 2005/0133082 | A1 | * | 6/2005 | Konold et al. ................. 136/246 |
| 2007/0227533 | A1 | * | 10/2007 | Butler ............................ 126/651 |
| 2008/0116687 | A1 | * | 5/2008 | Filippi et al. .................. 285/231 |
| 2009/0165483 | A1 | * | 7/2009 | Liu et al. ....................... 62/235.1 |

OTHER PUBLICATIONS

Clean Energy Resource Teams Monthly Update Jun. 2007.*
CERTs Meeting Summary Oct. 11, 2007.*
CERT Case Study: "Solar Space Heating System Warms Rooms for Sebeka Family" Dec. 2005.*
Pineandlakes.com article "Products unveiled in quest for more affordable solar energy" Oct. 17, 2007.*
"Saving the Environment with Solar Energy." Washington University in St. Louis Magazine website capture of Alumni Profile Fall 2008.*
"Sun powers heaters for low-income families." Minnesota Public Radio News. Apr. 30, 2013.*
"CERTs 2007 Conference Agenda & Presentations" web capture from Clean Energy Resource Teams website.*
Blueprint of Solar Furnace Array prepared for Rural Renewable Energy Alliance, precise date unknown. Upon information and belief, the blueprint was disclosed to a third party prior to Aug. 26, 2007.

* cited by examiner

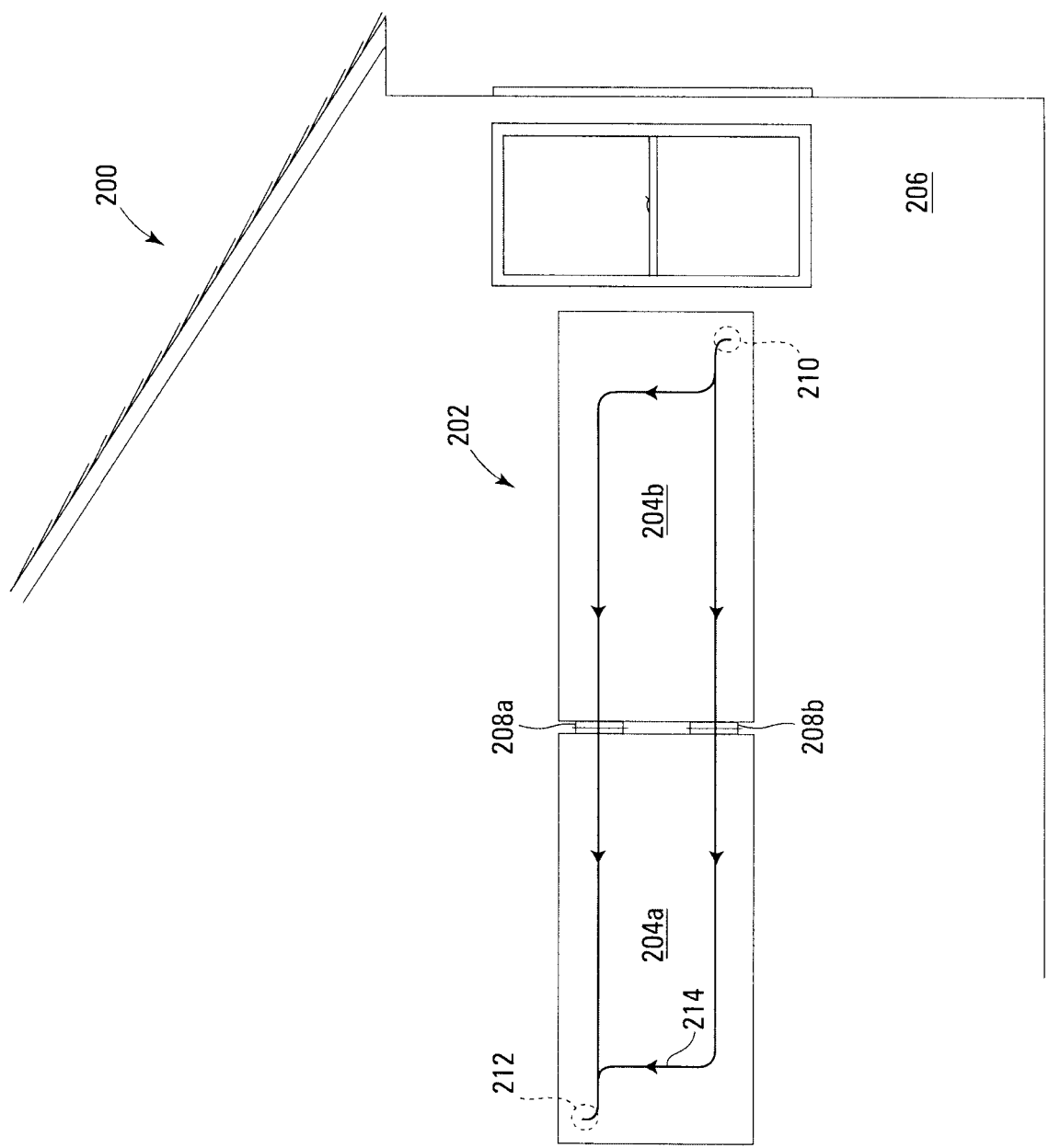

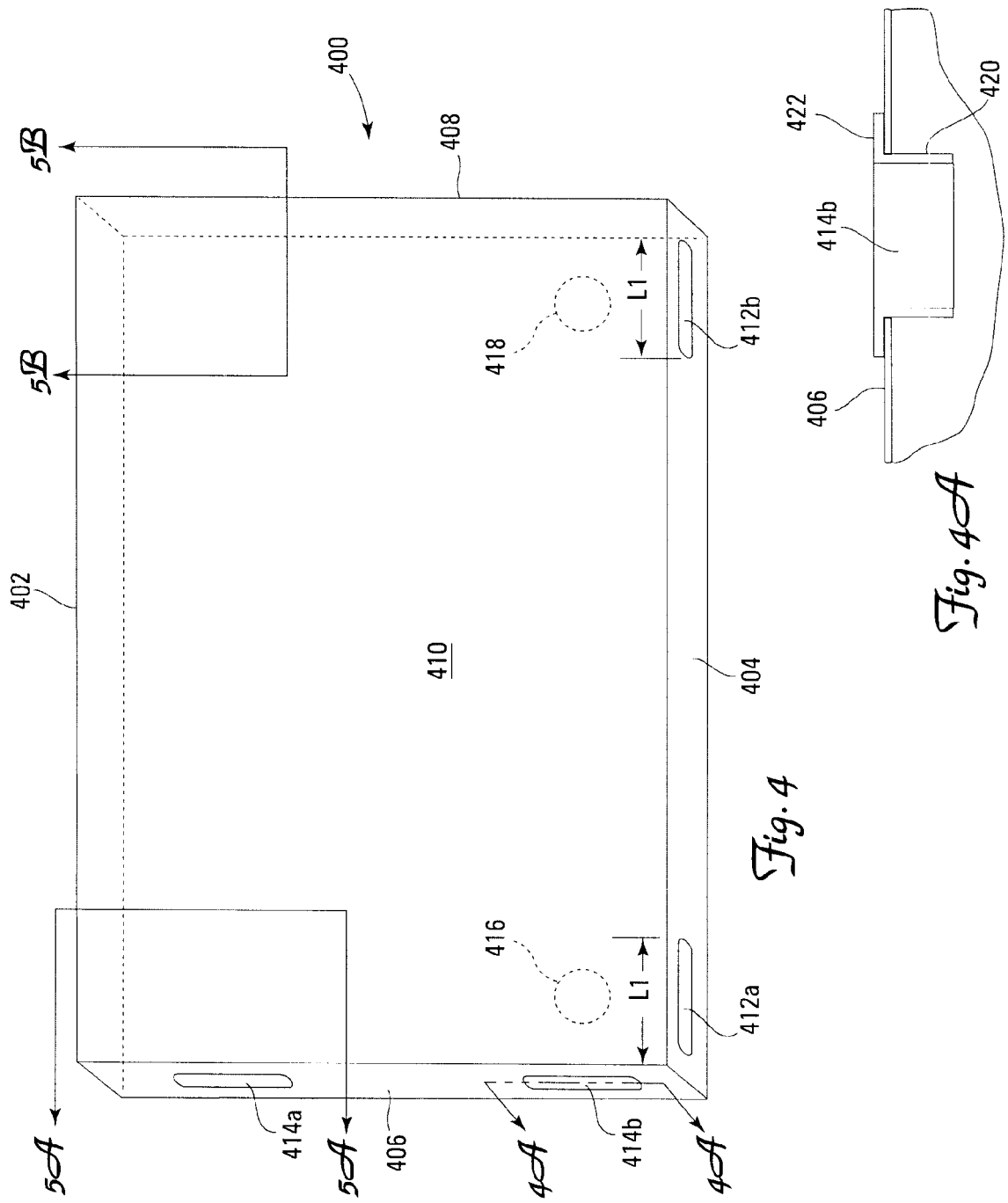

SOLAR POWERED FURNACE AND FURNACE ARRAY

This application claims the benefit of U.S. Provisional Application Ser. No. 61/092,292, filed Aug. 27, 2008, the entire content of which is incorporated herein by reference.

TECHNICAL FIELD

The disclosure relates to solar powered furnaces.

BACKGROUND

Solar heat collectors may be used as a stand-alone heating system or a component of a larger heating system for a wide range of structures, including, for example, residential dwellings, commercial and industrial buildings, and the like. Solar heat collectors include an absorption panel or other absorption structure that absorbs electromagnetic energy emitted by the sun and converts the electromagnetic energy to heat. The heat is then transferred from the absorption panel to a heat transfer fluid, such as, for example, air or water, which may be used to heat an interior of the structure. Solar powered furnaces are a relatively clean heating source, especially when a heat transfer fluid such as air or water is used, because no fuels are burned, and a relatively small amount of electricity is used to power a pump or fan to move the heat transfer fluid. Additionally, solar powered furnaces may have relatively low recurring operating expenses, because only a pump or fan is used to move the heat transfer fluid; as stated above, fuel is not burned to produce heat. Because of this, solar powered furnaces may be used to supplement other, conventional, heating systems to provide a more cost-effective, hybrid heating system.

SUMMARY

In general, the disclosure is directed to a solar powered furnace. In some embodiments, the solar powered furnace may include a hidden mounting system for mounting the solar powered furnace to a structure. In some embodiments, the solar powered furnace may include a back pass air channel formed in part by a solar absorption plate and a duct floor that results in laminar air flow through the back pass air channel, at flow rates that are used. In some embodiments, the solar powered furnace may be one of a plurality of solar powered furnaces in a solar powered furnace array. The solar powered furnace array may include an array interconnect that fluidically couples a first solar powered furnace and a second solar powered furnace.

In some embodiments, the disclosure is directed to a solar powered furnace array which includes a first solar powered furnace including a first sidewall that defines a first port and a second solar powered furnace including a second sidewall that defines a second port. The solar powered furnace array also includes an array interconnect that includes a first receiver at least partially inserted in the first port, a second receiver at least partially inserted in the second port, and an array interconnect stent. The array interconnect stent is at least partially inserted in each of the first receiver and the second receiver to fluidically couple the first solar powered furnace and the second solar powered furnace.

In other embodiments, the disclosure is directed to a solar powered furnace including a glass pane, a solar absorption plate oriented substantially parallel to the glass pane, and a duct floor oriented substantially parallel to the glass pane and the solar absorption plate and located on an opposite side of the solar absorption plate from the glass pane. The solar absorption plate and duct floor define a back pass air channel, and at least one of a distance between the solar absorption plate and the duct floor and a flow rate of air in the back pass air channel are selected such that the air flows through the back pass air channel in a laminar flow regime.

In a further embodiment, the disclosure is directed to a solar powered furnace mounting system including a mounting channel defined in a back surface of a solar powered furnace and a mounting rail configure to fit in the mounting channel. The mounting rail is attached to a structure, and the mounting rail is attached, within the mounting channel, to the solar powered furnace to mechanically couple the solar powered furnace to the structure.

In yet another embodiment, the disclosure is directed to a method of installing a solar powered furnace array. The method includes mounting a first solar powered furnace to a mounting rail attached to a structure, inserting an array interconnect stent in a first array interconnect receiver inserted in a port in the first solar powered furnace, and mounting a second solar powered to the mounting rail. The array interconnect stent is inserted in a second array interconnect receiver inserted in a port in the second solar powered furnace.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 2 is a conceptual diagram illustrating another example of a solar powered furnace array mounted on a sidewall of a house.

FIGS. 4 and 4A are a perspective view and a cross-sectional view, respectively, of an example solar powered furnace.

DETAILED DESCRIPTION

In general, the disclosure is directed to solar powered furnaces. More specifically, the disclosure is directed to solar powered furnaces including features that improve the performance and/or usability of a solar powered furnace or an array of solar powered furnaces. For example, in some embodiments, a solar powered furnace may include an array interconnect that facilitates fluidic coupling of two or more solar powered furnaces. In other embodiments, a solar powered furnace may include a mounting system that provides substantially hidden mounting of the solar powered furnace to a structure. In yet other embodiments, a solar powered furnace may include a back pass air channel geometry and airflow rate that results in laminar flow of the air in the back pass air channel.

The solar powered furnace of the present disclosure may be mounted to a structure such as, for example, an office building, a commercial building, an industrial building, a multi-unit housing structure, a single family housing structure, or the like. The solar powered furnace may be mounted to the structure during construction of the structure, or the solar powered furnace may be mounted to an existing structure as a retrofit installation. In other embodiments, the solar powered furnace may be mounted to an area of ground adjacent a structure, or may be mounted on a mounting frame adjacent a structure.

Figure 1:
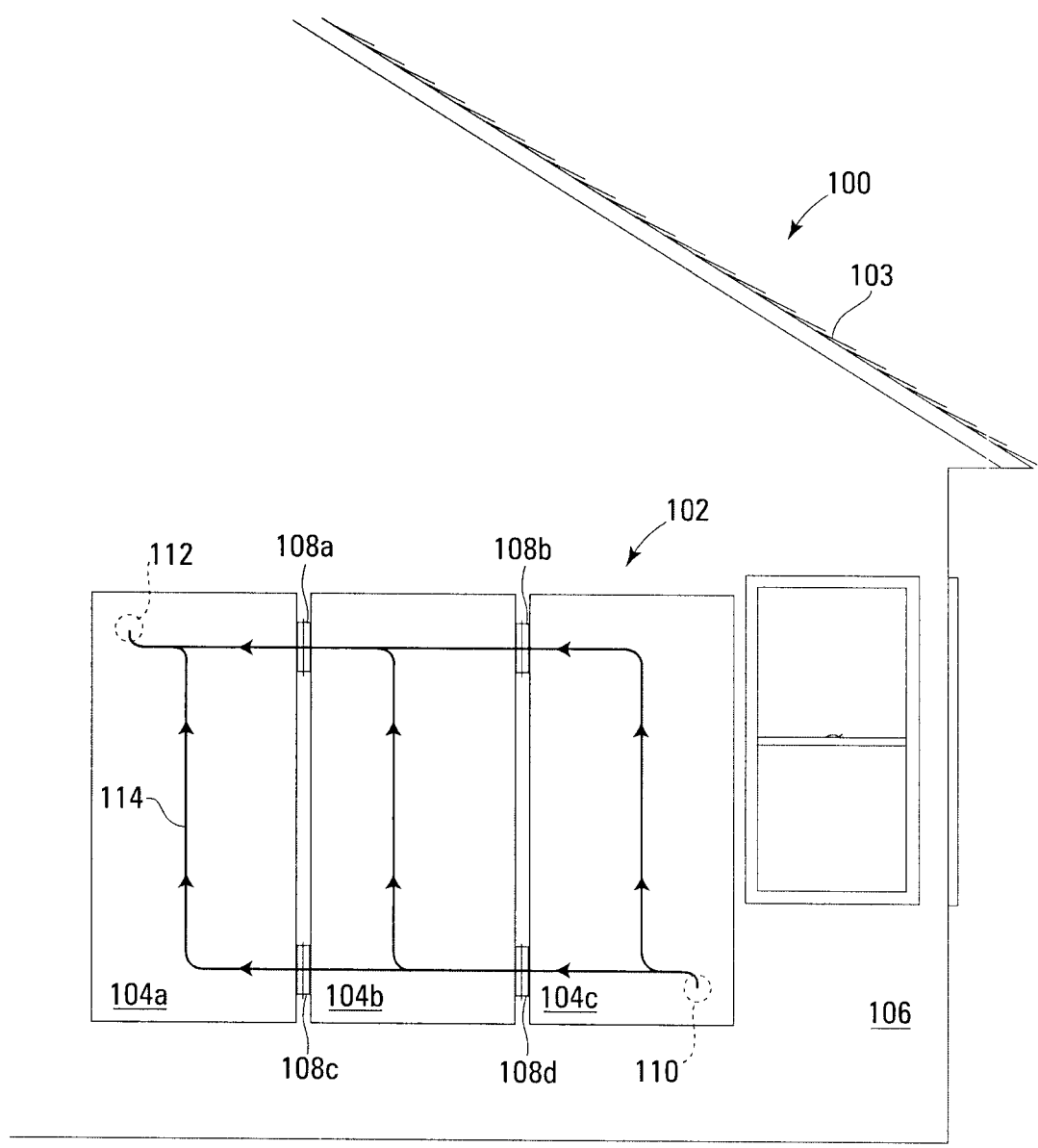
FIG. 1 is a conceptual diagram illustrating an example of a solar powered furnace array mounted on a sidewall of a house.

FIG. 1 is a block diagram illustrating a side view of a house 100 including an example solar powered furnace array 102, which includes three solar powered furnaces 104a, 104b, 104c (collectively "solar powered furnaces 104") mounted on a side wall 106 of house 100 in a portrait orientation (e.g., greater height than width). In other embodiments, solar powered furnaces 104 may be mounted on the side wall 106 of house 100 in a landscape orientation (e.g., greater width than height). Solar powered furnace array 102 may also be mounted to other locations of a structure, such as house 100. For example, in some embodiments, solar powered furnace array 102 may be mounted to a roof 103 of house 100.

Solar powered furnaces 104 may be mounted directly to the siding of the house 100, or may be mounted to the sheathing of the house. In embodiments in which solar powered furnaces 104 are installed as part of a retrofit installation (installed on an existing structure) a portion of the siding corresponding to the location at which solar powered furnaces 104 will be mounted may be removed so that furnaces 104 may be mounted to the sheathing. In some embodiments, this may be preferable to mounting furnaces 104 to the siding, as gaps formed between furnaces 104 and the siding may become filled with detritus, water, or become a home for insects, bats, birds, or the like.

In the illustrated embodiment, solar powered furnace array 102 includes three solar powered furnaces 104a, 104b, 104c. However, in other embodiments, a solar powered furnace array 102 may include two solar furnaces 104, or may include more than three solar furnaces 104. In other embodiments, a single solar powered furnace (e.g., furnace 104a) may be mounted to house 100. Additionally, in some embodiments, more than one solar powered furnace array 102 may be mounted to house 100, or a plurality of individual solar powered furnaces 102 (e.g., multiple, non-interconnected solar powered furnaces) may be mounted to house 100.

Solar powered furnaces 104 include a solar absorption plate (e.g., solar absorption plate 518 of FIGS. 5A and 5B) that absorbs solar energy (i.e., electromagnetic energy emitted by the sun) and converts the absorbed solar energy to heat. Solar powered furnaces 104 also include at least one channel (e.g., back pass air channels 526 of FIGS. 5A and 5B) through which a fluid flows and thermally contacts the solar absorption plate to transfer at least a portion of the heat of the absorber plate to the fluid. In some embodiments, the fluid may include air, such as air from within house 100.

In the embodiment illustrated in FIG. 1, solar powered furnace array 102 includes a plurality of array interconnects 108a, 108b, 108c, 108d (collectively "array interconnects 108"). Each of array interconnects 108 fluidically couples one of solar powered furnaces 104 to a second of solar powered furnaces 104. For example, array interconnects 108a and 108b each fluidically couple solar powered furnace 104a to solar powered furnace 104b. Similarly, array interconnects 108c and 108d each fluidically couple solar powered furnace 104b to solar powered furnace 104c.

Because array interconnects 108 fluidically couple solar powered furnaces 104, solar powered furnace array 102 may include only a single air inlet orifice 110, which returns air to the solar powered furnace array 102, and a single air outlet orifice 112, which supplies air to the interior of house 100. This may be desirable, for example, to reduce the number of penetrations through side wall 106 of house 100. For example, air inlet orifice 110 may penetrate side wall 106 and fluidically couple to a room within house 100 via ductwork. Similarly, air outlet orifice 112 may penetrate side wall 106 and fluidically couple to a room within house 100 via ductwork. In some embodiments, air inlet orifice 110 and air outlet orifice 112 fluidically couple to the same room within house 100, while in other embodiments, air inlet orifice 110 couples to a first room within house 100 and air outlet orifice 112 couples to a second, different, room within house 100.

House 100, and other structures to which solar powered furnace array 102 may be mounted, typically include a plurality of rooms. In some embodiments, the heating requirements and, in some cases, temperature of at least a first of the plurality of rooms may be different from at least a second of the plurality of rooms. For example, a room that includes an exterior wall that receives little solar exposure, such as a room with an exterior wall that is oriented substantially north facing (in the Northern Hemisphere), may require greater heating than a room including an exterior wall that faces south. Accordingly, in embodiments in which one or more solar powered furnaces 104 or one or more solar powered furnace arrays 102 are used to supplement a conventional heating system that uses electricity, natural gas, propane, or the like, the one or more solar powered furnaces 104 or one or more solar powered furnace arrays 102 may be mounted to house 100 such that air outlet orifice 112 supplies heated air to a room with a higher heating requirement, such as a room with a north-facing exterior wall. However, the mounting location of the one or more solar powered furnaces 104 or one or more solar powered furnace arrays 102 may also be influenced by factors including available mounting space on house 100 and sun exposure (e.g., presence or absence of trees or other structures that may block sun exposure).

In the embodiment illustrated in FIG. 1, air inlet orifice 110 is located at a lower vertical position of house 100 than air outlet orifice 112. This arrangement may provide increased air circulation. For example, heated air from the solar powered furnace array 102 exits air outlet orifice 112 relatively close to a ceiling of the room to which array 102 is fluidically coupled, while cooler air near a floor of the room is drawn into solar powered furnace array 102 through air inlet orifice 110 at a relatively low location within the room. This causes the heated air, which is located near a ceiling of the room, to be pulled down from the ceiling as the cooler air enters array 102, and, as a result, improves air circulation within the room within house 100. Further, the arrangement may result in cooler air entering air inlet orifice 110 than if air inlet orifice 110 were located above air outlet orifice 112. This may improve the efficiency of solar powered furnace array 102, as the temperature differential between the cooler air and a solar absorption panel within solar powered furnaces 104 is relatively greater than if warmer air were drawn into air inlet orifice 110.

As described in further detail below, the position of each of air inlet orifice 110 and air outlet orifice 112 may be determined when solar powered furnace array 102 is mounted to house 100, and orifices 110 and 112 may be formed in solar powered furnaces 104c and 104a, respectively, at this time. In some embodiments, orifices 110 and 112 may each be positioned within a header air space of solar powered furnaces 104c and 104a, respectively (see, e.g., FIG. 4). This may allow more flexibility in mounting positions because, for example, air inlet orifice 110 may be formed in solar powered furnace 104c at a location which avoids studs, floor joists, wiring, or other obstructions in the outer wall of house 100.

In the embodiment illustrated in FIG. 1, the individual solar powered furnaces 104 are connected in a parallel reverse return flow configuration, indicated by flow lines 114. That is, air enters solar powered furnace array 102 through air inlet orifice 110. A first portion of the air flows vertically through solar powered furnace 104c, where the first portion of air is heated by absorption of heat from a solar absorber in furnace 104c. The remainder of the air flows through array interconnect 108d into solar powered furnace 104b. A second portion of air flows vertically through solar powered furnace 104b, in which the second portion of air is heated by heat from a solar absorber in solar powered furnace 104b, while a third portion of air flows through array interconnect 108 into solar powered furnace 104a. The first portion of air, which flows vertically through solar powered furnace 104c, flows through array interconnect 108b into solar powered furnace 104b, where it mixes with the second portion of air that flowed vertically through solar powered furnace 104b. The combined heated stream of air, including the first and second portions of air, flows through array interconnect 108a into solar powered furnace 104a, where the third portion of air, which flowed vertically through and was heated in solar powered furnace 104a, mixes with the combined stream including the first portion and portions of air. All three portions of air, which are now heated, exit solar powered furnace array 102 through air exit orifice 112.

A parallel reverse return flow pattern 114 may be desirable to increase the number of solar powered furnaces in array 102 while minimizing the increase in the required air pressure to be provided by a fan. For example, parallel air flow through three solar powered furnaces 104 may require a fan of lower horsepower than series air flow through three solar powered furnaces 104. Thus, a solar powered furnace array 102 configured for parallel airflow may increase overall energy efficiency compared to a solar powered furnace array 102 configured for series airflow.

Additionally, parallel air flow may result in relatively greater heating efficiency than a series air flow configuration. While not wishing to be bound by a particular theory, in parallel air flow, the air flowing through the length of each of solar powered furnaces 104 enters the furnace 104a, 104b or 104c at approximately the same temperature and is heated approximately the same amount by each of furnaces 104. Each of furnaces 104 operates at approximately the same heating efficiency. To contrast, in a series air flow configuration air enters a first furnace at a relatively low, unheated temperature, is heated in the first furnace to a first temperature, and enters a second furnace at the first temperature. The first temperature is closer to the temperature of a solar absorption panel in the second furnace, and thus, the driving force for heat transfer from the solar absorption panel in the second furnace to the air is reduced, and the air experiences less heating in the second furnace. This lowers the heating efficiency of the second furnace. As similar effect will occur with each subsequent furnace added in a series configuration.

In other embodiments, a solar powered furnace array 102 connected in a parallel reverse return air flow configuration may include solar powered furnaces 104 oriented in landscape orientation (e.g., width greater than height). Compared to FIG. 1, the resulting configuration is rotated 90 degrees clockwise, such that each of the solar powered furnaces 104 is oriented in landscape, with array interconnects 108 fluidically coupling respective furnaces 104 and air inlet orifice 110 again located lower than the air outlet orifice 112.

However, in some embodiments, considerations such as available mounting area and suitable locations for air inlet orifice 110 and air outlet orifice 112 may indicate that another array geometry and flow pattern may be necessary or desired. For example, as shown in FIG. 2, a solar powered furnace array 202 may include two solar powered furnaces 204a, 204b (collectively "solar powered furnaces 204") connected in series in landscape orientation on a side 206 of a house 200. The solar powered furnaces 204 may also be connected in series in portrait orientation, where the array 202 extends substantially vertically. In other embodiments, solar powered furnace array 202 may include more than two solar powered furnaces. In the embodiment illustrated in FIG. 2, solar powered furnace 204a is fluidically coupled to solar powered furnace 204b by two array interconnects 208a and 208b (collectively "array interconnects 208"). In other embodiments, solar powered furnace 204a may be fluidically coupled to solar powered furnace 204b by a single array interconnect or more than two array interconnects.

As indicated by flow pattern 214, air enters the solar powered furnace array 202 through an air inlet orifice 210 and flows through the first solar powered furnace 204a. The air then flows through array interconnects 208 to second solar powered furnace 204b and out of solar powered furnace array 202 through an air outlet orifice 212. Further details of the flow patterns within a solar powered furnace, such as solar powered furnace 104a, 104b, 104c, 204a, or 204b, will be described below with reference to FIGS. 5A and 5B.

Connecting solar powered furnaces 204a and 204b in series may necessitate a more powerful fan to force or draw air through solar powered furnace array 202 than a solar powered furnace array including two solar powered furnaces connected in parallel. In addition, the efficiency of the solar powered furnace array 202 may be lower relative to a solar powered furnace array including two solar powered furnaces connected in parallel. While not wishing to be bound by any theory, the air flowing into and through second solar powered furnace 204b has been heated by solar powered furnace 204a. This may diminish the temperature differential between a solar absorption panel in solar powered furnace 204b and the air, which reduces the heat transfer driving force and thus reduces the amount of heat transferred from a solar absorption panel to the air in solar powered furnace 204b. In spite of this loss of efficiency, a series configuration may be desirable due to installation considerations such as, for example, preferred locations of air inlet orifice 210 and air outlet orifice 212, or available area for installation of solar powered furnaces 204 on house 200.

FIGS. 3A-G illustrate various views of an example array interconnect 300, which may be similar to array interconnects 108 and 208 illustrated in FIGS. 1 and 2. Array interconnect 300 includes a first array interconnect receiver 302a (or "first receiver 302a"), a second array interconnect receiver 302b (or "second receiver 302b;" collectively "receivers 302") and an array interconnect stent 304. Array interconnect 300 may be used to fluidically couple a first solar powered furnace to a second solar powered furnace, as illustrated in FIGS. 1 and 2.

Figure 3A:
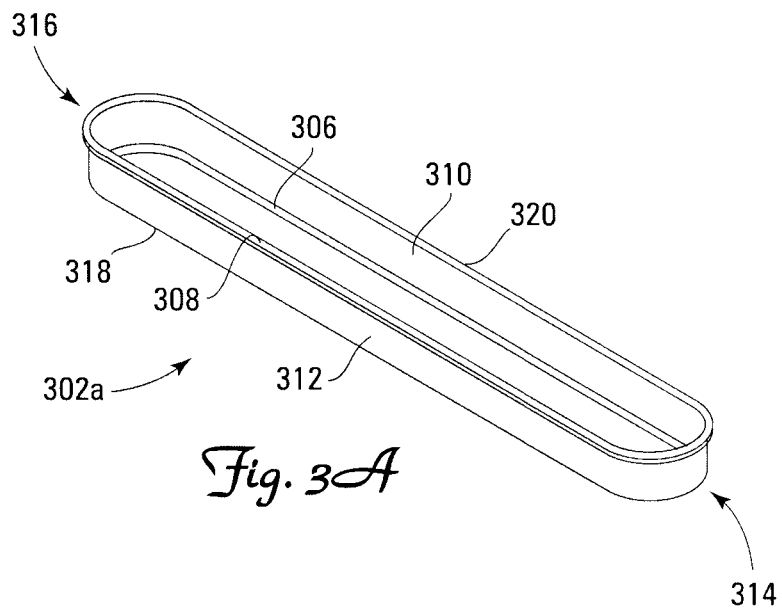
FIGS. 3A-G are diagrams illustrating various views of an example of an array interconnect including a first receiver, a second receiver and an array interconnect stent.
Figure 3B:
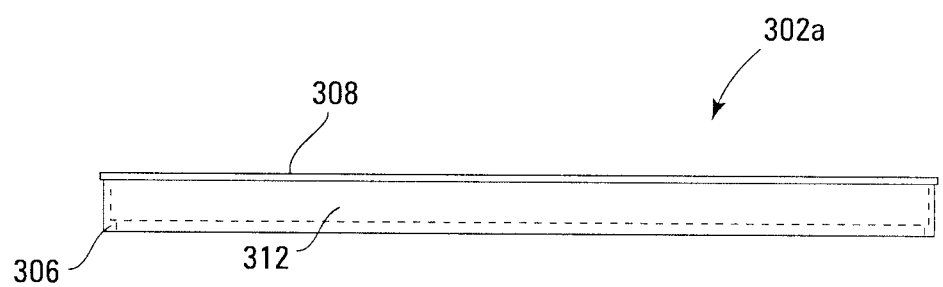

As shown in FIGS. 3A and 3B, first receiver 302a (second receiver 302b is substantially identical to first receiver 302a) includes a receiver outer surface 312 and a receiver inner surface 310. In the illustrated embodiment, first receiver 302a is generally rectangular in shape, with rounded ends 316, 314. However, in other embodiments, first receiver 302a may include a different shape, such as, for example, circular, elliptical, rectangular with less rounded ends, or the like.

First receiver 302a also includes a first lip 308 extending substantially normal outward from receiver outer surface 312 along the outer perimeter of a first edge 320 of first receiver 302a. First lip 308 forms a contact surface which a sidewall of a solar powered furnace contacts when first array interconnect receiver 302a is inserted in a port of the solar powered furnace (see, e.g., FIG. 4A). First receiver 302a further includes a second lip 306 extending substantially normal inward from receiver inner surface 310 along the inner perimeter of a second edge 318 of first receiver 302a. As best seen in FIG. 3F, in which stent 304 is fully inserted into first receiver 302a and partially inserted into receiver 302b, second lip 306 forms a contact surface which an edge 326 or 328 of array interconnect stent 304 contacts when stent 304 is fully inserted in first receiver 302a. Contact between second lip 306 and edge 326 or 328 of array interconnect stent 304 forms a first seal between stent 304 and first receiver 302a.

Figure 3C:
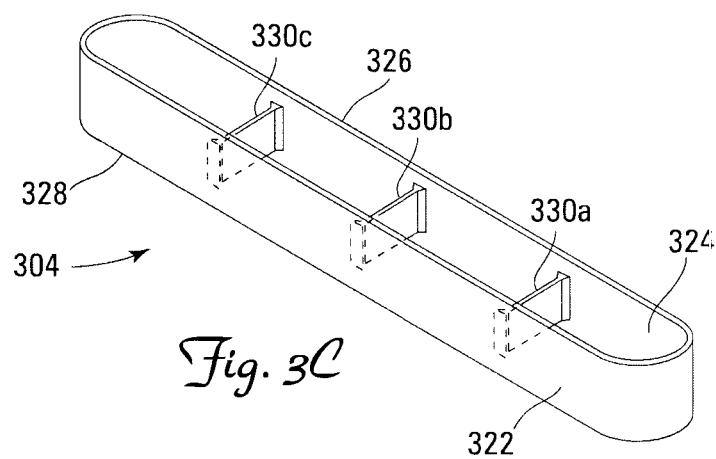
Figure 3D:
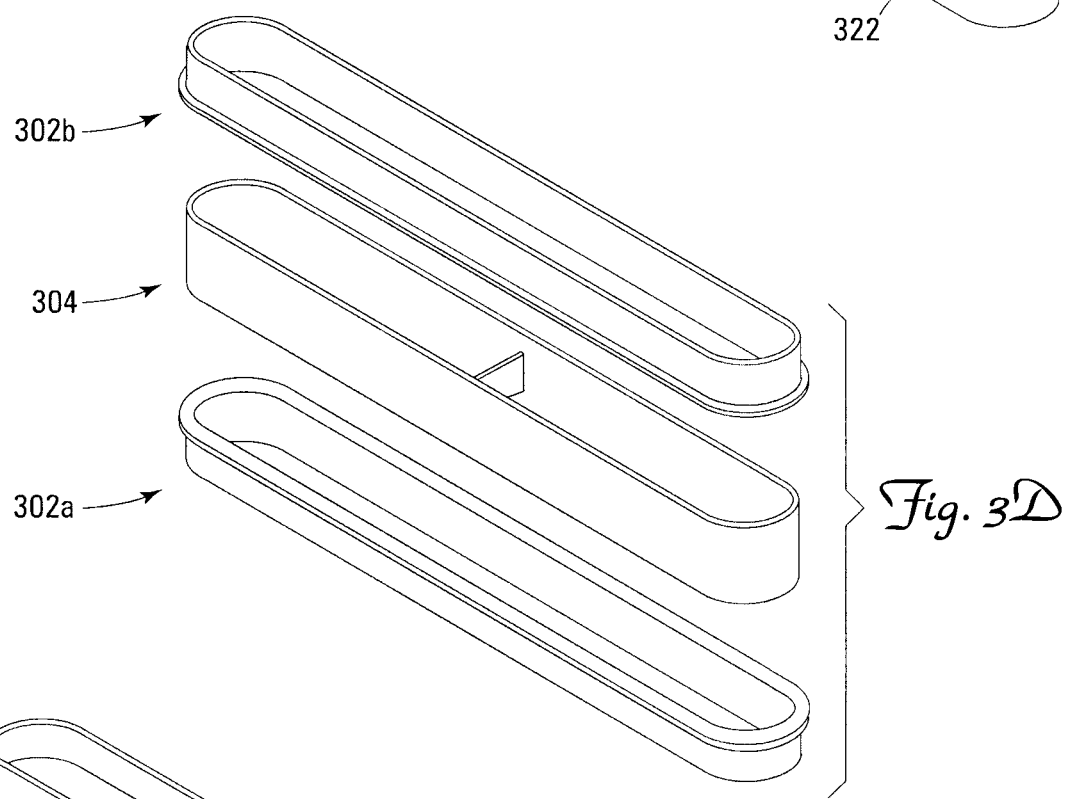
Figure 3E:
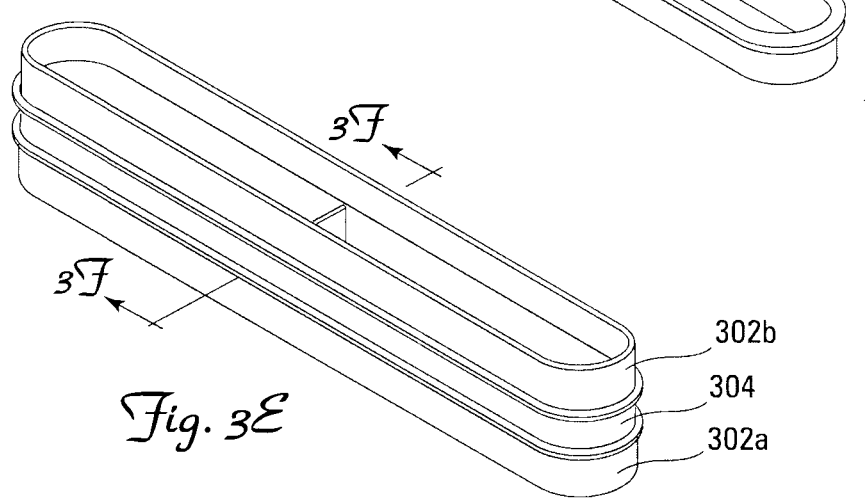
Figure 3F:
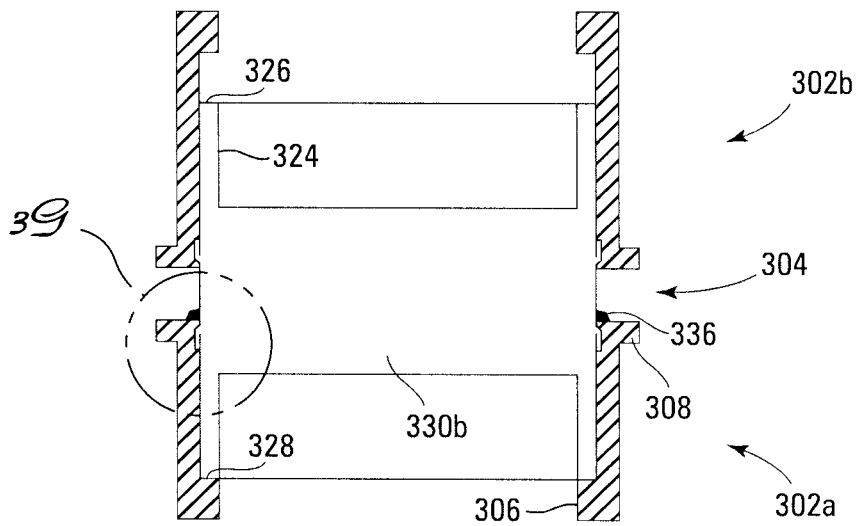

Array interconnect stent 304, which is best viewed in FIGS. 3C, 3D and 3F, includes a stent outer surface 322 that extends from a stent first edge 326 to a stent second edge 328 and a stent inner surface 324 that extends from stent first edge 326 to stent second edge 328. Stent outer surface 322 contacts inner surface 310 of first receiver 302a when array interconnect stent 304 is inserted in first receiver 302a. Similarly, stent outer surface 322 contacts an inner surface of second receiver 302b when array interconnect stent 304 is inserted in second receiver 302b.

Array interconnect stent 304 also includes three cross supports 330a, 330b, 330c (collectively "cross supports 330"), which help maintain the shape of stent 304 to ensure contact between stent outer surface 322 and inner surface 310 of first receiver 302a (and, similarly, an inner surface of second receiver 302b). In other embodiments, array interconnect stent 304 may include more than three cross supports 330, fewer than three cross supports 330, or may not include any cross supports 330

Figure 3G:
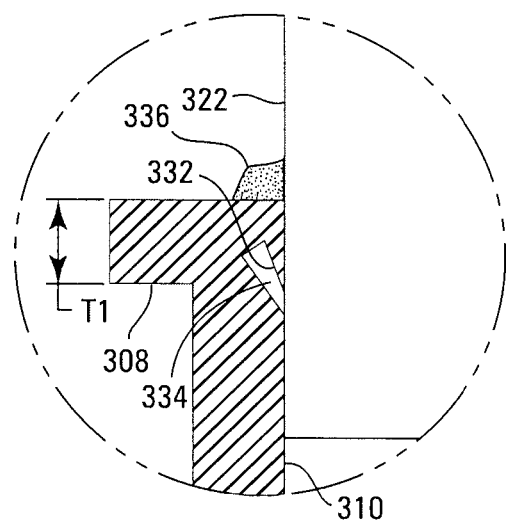

As illustrated in FIGS. 3F and 3G, a second seal between first receiver 302a and array interconnect stent 304 may be formed by a flexible overhang 332 that is formed in first receiver 302a. Flexible overhang 332 extends beyond receiver inner surface 310 and, when stent 304 is inserted in first receiver 302a, presses against stent outer surface 322. First receiver 302a also includes a gap 334 formed in receiver inner surface 310, which allows flexible overhang 332 to flex when contacting stent outer surface 322.

In some embodiments, array interconnect 300 may further include a bead of caulk 336 applied between stent 304 and first receiver 302a at edge 320. The bead of caulk 336 forms a third seal between first receiver 302a and stent 304. Additionally, when stent 304 is fully inserted into second receiver 302b, bead of caulk 336 may form a third seal between second receiver 302b and stent 304, and may form a seal directly between first receiver 302a and second receiver 302b.

The design and construction of array interconnect 300 may lead to substantially air tight fluidic coupling between a first solar powered furnace and a second solar powered furnace (e.g., first solar powered furnace 204a and second solar powered furnace 204b). Furthermore, the design of array interconnect 300 is such that little space is required between solar powered furnaces 204 (or solar powered furnaces 104). For example, only the thickness T1 of first lip 308 on each of receiver 302a and second receiver 302b may be required between adjacent solar powered furnaces. This thickness may be as little as approximately ⅛ inch, and in some embodiments, the construction of the solar powered furnace may be such that a projection near a top panel of the solar powered furnace substantially hides the first lip 308 and forms a substantially continuous surface, as described in further detail below. Additionally, the array interconnect 300 facilitates modular installation of the solar powered furnace array and improves flexibility in the number of solar powered furnaces used in the array.

Receivers 302 and array interconnect stent 304 may be formed of a variety of flexible and heat resistant materials, such as natural or synthetic polymers including rubber, silicone, polyurethane, or the like. In some embodiments, at least one of receivers 302 and the array interconnect stent 304 may comprise ethylene propylene diene monomer rubber (EPDM rubber).

FIG. 4 is a perspective back view of an example solar powered furnace 400. Solar powered furnace 400 includes a first long sidewall 402 and a second long sidewall 404 extending substantially parallel to first long sidewall 402. First long sidewall 402 and second long sidewall 404 are joined at one end by first short sidewall 406, and at a second end by second short sidewall 408, which extends substantially parallel to first short sidewall 406. Sidewalls 402, 404, 406 and 408 define a perimeter of solar powered furnace 400. Each of sidewalls 402, 404, 406 and 408 may be formed of metal or another weatherproof and substantially rigid material, and in some embodiments, are aluminum extrusions.

Figure 5A:
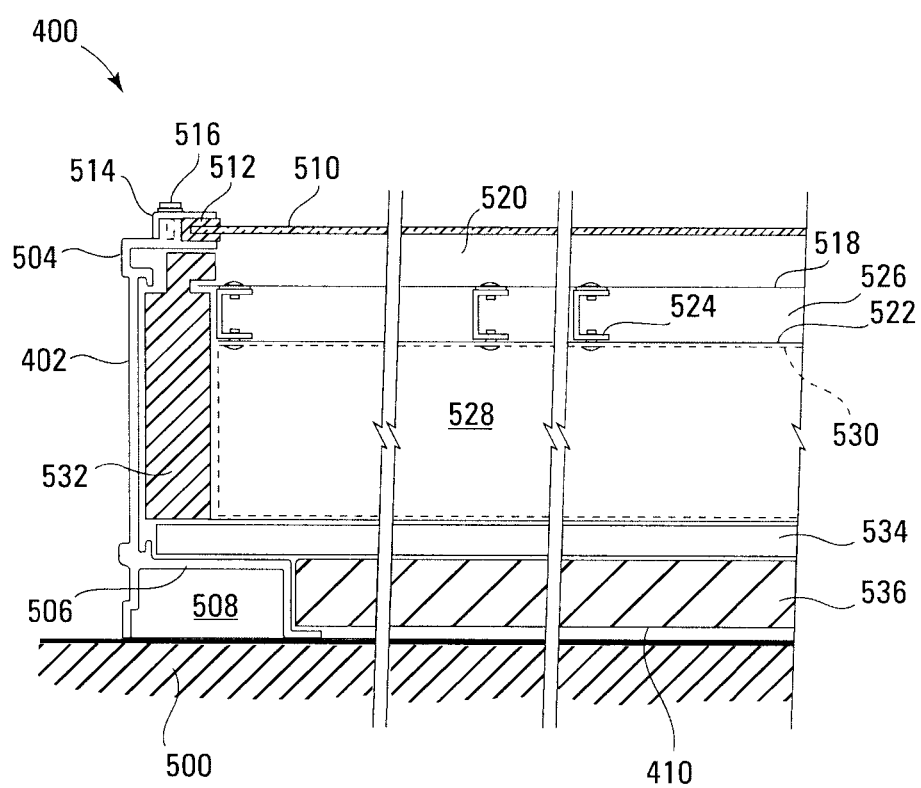
FIGS. 5A and 5B are a cross-sectional side view and a cross-sectional end view, respectively, of an example solar powered furnace.
Figure 5B:
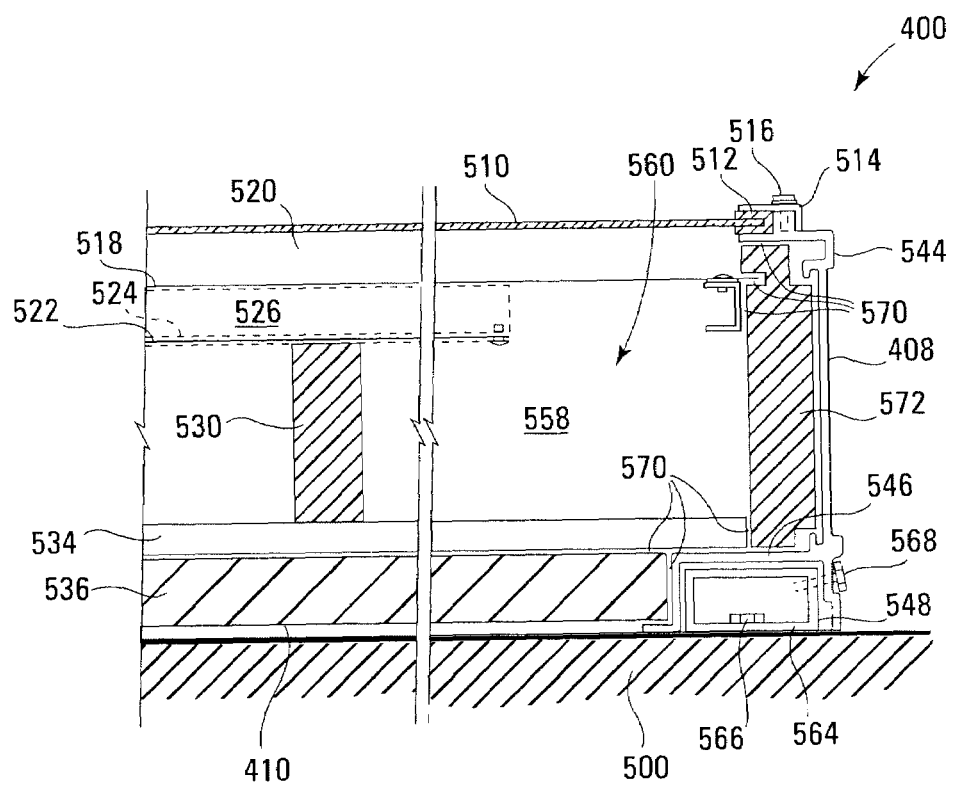

Solar powered furnace 400 also includes a back surface 410, which may be defined by, for example, a surface of an outer back insulation sheet (see, e.g., FIGS. 5A and 5B). In other embodiments, back surface 410 may be defined by a piece of sheet metal, such as for example, an aluminum sheet, or a plastic sheeting to provide further weatherproofing of solar powered furnace 400.

A top surface (not shown) of solar powered furnace 400 may be defined by a glass sheet (see, e.g., FIGS. 5A and 5B) or another material substantially transparent to solar radiation.

FIG. 4 also illustrates potential locations for a first parallel port 412a and a second parallel port 412b (collectively "parallel ports 412") in second long sidewall 404, and a first series port 414a and a second series port 414b (collectively "series ports 414") in first short sidewall 406. Although not shown in FIG. 4, solar powered furnace 400 may also include series ports 414 defined at similar locations in second short sidewall 408 and parallel ports 414 defined at similar locations in first long sidewall 402.

Solar powered furnace 400 will not typically include all possible parallel ports 412 and series ports 414. The selection of which ports 412 and 414 will be formed in solar powered furnace 400 depends on the number of solar powered furnaces in a solar powered furnace array, the location of the solar powered furnace in the solar powered furnace array, and whether the solar powered furnaces in the array are connected in series or parallel. For example, in embodiments in which a single solar powered furnace 400 is installed, solar powered furnace 400 will not include any parallel ports 412 or series ports 414.

As another example, in embodiments in which three solar powered furnaces are connected in parallel, as illustrated in FIG. 1, a first solar powered furnace (e.g., furnace 104a) may include parallel ports 412 formed in second long sidewall 404. In the example embodiment, a second solar powered furnace (e.g., furnace 104b) may include parallel ports 412 formed in both first long sidewall 402 and second long sidewall 404, and a third solar powered furnace (e.g., furnace 104c) may include parallel ports 412 formed in first long sidewall 402.

As yet another example, in embodiments in which two solar powered furnaces are connected in series, as illustrated in FIG. 2, a first solar powered furnace (e.g., furnace 204a) may include series ports 414 formed in one of first short sidewall 406 and second short sidewall 408 and a second solar powered furnace (e.g., furnace 204b) may include series ports 414 formed in one of first short sidewall 406 and second short sidewall 408. The respective ports 414 are then fluidically coupled by an array interconnect, such as array interconnect 300.

In some embodiments, the number and configuration of solar powered furnace(s) 400 in a solar powered furnace array is determined prior to manufacturing the solar powered furnace(s) 400. Then, during manufacture of the furnace(s) 400, the appropriate number of parallel side ports 412 or series ports 414 is formed in at least one of side walls 402, 404, 406 and 408 of each of the solar powered furnace(s) 400.

In other embodiments, a solar powered furnace 400 may be manufactured that does not include any parallel ports 412 or series ports 414. In these embodiments, the number and configuration of solar powered furnace(s) 400 in an installation may be determined and the appropriate parallel ports 412 or series ports 414 may be formed in the solar powered furnace (s) 400 at the installation site prior to installing the solar powered furnace(s) 400. This may provide more flexibility in the installation, but requires more work to be performed at the installation site.

FIG. 4 also illustrates a length L1 measured from each of first short sidewall 406 and second short sidewall 408. Length L1 indicates a length of a first and second header air space (see FIG. 5B), into which one or more of parallel ports 412, series ports 414, an air inlet orifice 416, and an air outlet orifice 418 may open. The first and second header air spaces open into a back-pass air channel, as described in further detail with respect to FIGS. 5A and 5B.

The first and second header air spaces allow flexibility in the position at which each of parallel ports 412, series ports 414, air inlet orifice 416, and air outlet orifice 418 are formed in solar powered furnace 400. For example, as described in further detail below, air inlet orifice 416 and air outlet orifice 418 may each include a diameter between approximately 4 inches and 12 inches, and in some embodiments, between approximately 6 inches and 9 inches. Length L1 may vary according to the specific construction of solar powered furnace 400, and may range up to approximately half the length of the solar powered furnace 400. In some embodiments length L1 may be approximately equal to 21 inches. Of this 21 inches, in some embodiments approximately the first two inches measured from first short sidewall 406 and second short sidewall 408 may be used to mount solar powered furnace 400 (see, e.g., FIG. 5B) to a structure. Thus, in this example, first and second air header spaces, each approximately 19 inches long, are available in which air inlet orifice 416 and/or air outlet orifice 418 may be formed. Additionally, the first and second air header spaces each extend substantially the entire width of solar powered furnace 400. Thus, an area measuring approximately 19 inches long by the width of solar powered furnace 400, excepting any mounting spaces or insulation thickness adjacent long side walls 402 and/or 404 may be available for forming an air inlet orifice 416 or air outlet orifice 418.

The first and second air header spaces also provide flexibility for the positioning of parallel ports 412 or series ports 414. For example, the length L1 of first long sidewall 402 and second long sidewall 404 are available for parallel ports 412, except the thickness of first short sidewall 406 and any corresponding outer short side insulation (see FIG. 5B) or second short sidewall 408 and any corresponding outer short side insulation. Similarly, substantially the entire width of solar powered furnace 400 is available for series ports 414, except the thickness of first long sidewall 402 and any corresponding outer long side insulation (see FIG. 5A) and second long sidewall 404 and any corresponding outer long side insulation.

As shown in FIG. 4A, an array interconnect receiver 420 is inserted in series port 414b. Lip 422 of receiver 420 rests against first short sidewall 406 of solar powered furnace 400 and may be caulked to sidewall 406. Receiver 420 extends into solar powered furnace 400 past any insulation to ensure that air passing through receiver 420 does not contact the insulation and reduce the quality of the air that returns to a building to which solar powered furnace 400 is attached and fluidically coupled.

FIGS. 5A and 5B are a cross-sectional end view and cross-sectional side view, respectively, of solar powered furnace 400. While each of FIGS. 5A and 5B show approximately one-half of a width or length of solar powered furnace 400, furnace 400 may be substantially symmetric both lengthwise and widthwise. As seen in FIG. 5A, first long sidewall 402 includes a projection 504, which, in some embodiments, may project a distance equal to or greater than the thickness T1 of lip 422 of receiver 420. Thus, in embodiments in which solar powered furnace 400 is one furnace in an array of parallel-connected solar powered furnaces, projection 504 may butt against a corresponding projection on an adjacent solar powered furnace, forming a substantially continuous surface, and hiding the array interconnect. This may improve both weather resistance and aesthetic properties of a solar powered furnace array.

First long sidewall 402 also includes a portion against which glazing cap 514 presses to hold glass pane 510 in place. In the illustrated embodiment, an edge of glass pane 510 is inserted into a flexible sleeve 512, which is pressed between first long sidewall 402 and glazing cap 514 by glazing cap screw 516. Sleeve 512 allows glazing cap screw 516 to be tightened without damaging the glass 510, and provides secure mounting of glass pane 510 on solar powered furnace 400. Sleeve 512 also provides a water-tight seal between glass pane 510 and sidewall 402, contributing to the weather-resistance of the solar powered furnace 400. Sleeve 512 may be formed of, for example, rubber, polyurethane, silicone, or the like.

First long sidewall 402 also includes a long side inner projection 506, which defines a long side mounting channel 508. Channel 508 is sized to accept a mounting rail similar to mounting rail 564 shown in FIG. 5B. Long side mounting channel 508 may be used to provide hidden mounting of solar powered furnace 400 to house 500, and may be used in conjunction with short side mounting channel 548 (FIG. 5B), or alone. Selection of long side mounting channel 508 or short side mounting channel 548 may depend on, for example, the mounting orientation of solar powered furnace 400 and/or the available locations at which furnace 400 may be mounted to house 500.

First long sidewall 402 may be formed of, for example, metals including aluminum, steel, or the like, and may be formed by extrusion, molding, or the like.

Solar powered furnace 400 also includes a solar absorption plate 518 located below and oriented substantially parallel to glass pane 510. Solar absorption plate 518 and glass pane 510 define a first stagnant air space 520, which provides an insulating layer between the solar absorption plate 518 and the glass pane 510.

Solar absorption plate 518 includes a highly absorptive, low emissivity material, such as, for example, a selectively-surfaced metal sheet. Selectively-surface metal sheets include, for example, $TiNO_x$, black nickel, black chrome, sheets available under the trade designation Thermafin from Thermafin Holding, LLC, Jacksonville, Fla., and those available under the trade designation mirotherm from ALANOD-Sunselect GmbH & Co. KG, Lauenförde, Germany.

Duct floor 522 is mechanically coupled to solar absorption plate 518 by a plurality of rails 524. Rails 524 are attached to each of solar absorption plate 518 and duct floor 522 by a plurality of fasteners 525, which may include, for example, bolts, screws, nails, adhesive, or the like. Rails 524 define a distance between solar absorption plate 518 and duct floor 522 and a plurality of back pass air channels 526a, 526b, 526c (collectively "back pass air channels 526") between adjacent rails 524. Air flows through back pass air channels 526 and contacts solar absorption plate 518, which transfers heat from absorbed solar energy to the air. Back pass air channels 526 prevent air from the structure (e.g., house 100) from flowing between the solar absorption plate 518 and the glass pane 510, which prevents dust from the air from being deposited on the plate 518 or glass pane 510, which may decrease the absorption efficiency of the plate 518. Back pass air channels 526 also substantially eliminate conductive heat losses that would occur if the air from the structure contacted the glass pane as it flows through furnace 400.

The geometry of back pass air channels 526 may be designed so that air flows in a desired flow regime at air flow rates at which solar powered furnace 400 will be used. For example, a Reynolds number can be defined for each of back pass air channels 526 as:

$$N_{Re} = \frac{\rho v D_h}{\mu}$$

where $N_{Re}$ is the Reynolds number, $\rho$ is the density of air at the temperature of interest, $v$ is the velocity of air, $D_h$ is the hydraulic diameter of the respective one of back pass air channels 526, and $\mu$ is the viscosity of air at the temperature of interest. At Reynolds numbers of less than approximately 2100, the flow pattern may be characterized as laminar flow, while at Reynolds greater than approximately 6000, the flow pattern may be characterized as turbulent flow. At Reynolds numbers between approximately 2100 and 6000, the flow pattern may be characterized as transitional. It has been found that in some embodiments laminar flow may result in relatively efficient operation of the solar powered furnace 400.

In some embodiments, the distance D from the duct floor 522 to the solar absorption plate 518 may be approximately ¾ inches and the combined width of the back pass air channels 526 may be about 45⅕ inches. In these embodiments, air flow rates of below approximately 44 cubic feet per minute (CFM) may result in laminar flow, air flow rates of greater than approximately 126 CFM may result in turbulent flow, and intermediate flow rates may result in transitional flow.

In some embodiments, flow rates of air which result in laminar flow may be attainable without utilizing a fan to force air through solar powered furnace 400. For example, thermal convection-driven flow may result in flow rates of air through solar powered furnace 400 (e.g., back pass air channels 518) in the laminar flow regime. In other embodiments, a fan may provide air flow rates that result in a transitional or a turbulent air flow regime.

Solar powered furnace 400 includes insulation to reduce heat losses through first long sidewall 402 (and similarly second long sidewall 404) and back surface 410. As shown in FIG. 5A, solar powered furnace 400 may include outer long side insulation 532 adjacent first long sidewall 402 (and similarly second long sidewall 404). The outer long side insulation 532 may include a range of thicknesses, and in some embodiments may be about 1 inch thick.

Solar powered furnace 400 also includes inner back insulation 534 and outer back insulation 536, which insulate the back of solar powered furnace 400 from house 500. An outer surface of outer back insulation 536 defines back surface 410 of solar powered furnace 400 in FIGS. 5A and 5B. However, in other embodiments, solar powered furnace 400 may include a layer, such as a metal or plastic sheet, which defines back surface 410.

Reducing heat losses effectively increases the efficiency of the solar powered furnace 400, so it may be desirable to use relatively efficient insulation or a relatively large amount of insulation for outer long side insulation 532, inner back insulation 534 and outer back insulation 536. For example, in some embodiments, at least one of outer long side insulation 532, inner back insulation 534 and outer back insulation 536 includes a rated R-value of greater than R-8, measured in Imperial units ($ft^{2} \cdot °F \cdot h/Btu$). In other embodiments, at least one of outer long side insulation 532, inner back insulation 534 and outer back insulation 536 includes an insulation rating of about R-12 or greater than R-12. In some embodiments, each of outer long side insulation 532, inner back insulation 534 and outer back insulation 536 includes an insulation rating of greater than or equal to about R-12.

Solar powered furnace 400 further includes a second stagnant air space 528 between inner back insulation 534 and duct floor 522. Second stagnant air space 528 includes substantially the entire length of solar powered furnace 400 from insulation pillar 530 on a first end of solar powered furnace 400 (see FIG. 5B) to a similar insulation pillar 530 on a second, opposite end of solar powered furnace 400 (not shown).

FIG. 5B illustrates a side cross-sectional view of solar powered furnace 400. As FIG. 5B illustrates, solar powered furnace 400 includes a short side mounting channel 548, which receives a mounting rail 564. Mounting rail 564 is mechanically coupled to house 500 by a plurality of lag bolts, of which one lag bolt 566 is shown. In some embodiments, stainless steel lag bolts may be used to guard against rusting. However, in other embodiments, other suitable fasteners may be used.

Solar powered furnace 400 is placed over mounting rail 564 and receives mounting rail 564 in mounting channel 548. Second short sidewall 408 is then mechanically coupled to mounting rail 564 using a plurality of screws or other fasteners 568. In some embodiments, a plurality of self-tapping stainless steel screws may be used to attach second short sidewall 408 to mounting rail 564.

In some embodiments, two mounting rails 564 are used, and a second short side mounting channel adjacent first short sidewall 406 receives and is attached to the second mounting rail. Additionally, as described above with reference to FIG. 5A, in some embodiments, mounting rails are used in combination with long side mounting channel 508, and mounting rails 564 may or may not be used in conjunction with short side mounting channel 548.

FIG. 5B also illustrates a header air space 558, which opens into back pass air channel 526. As described above with reference to FIG. 4, each air inlet orifice 416 or air outlet orifice 418 fluidically couple to a header air space 558, albeit a different header air space 558. For example, in a solar powered furnace array including a single solar powered furnace 400, air inlet orifice 416 may fluidically couple to the shown header air space 558 and air outlet orifice 418 may fluidically couple to a header air space on an opposite end of solar powered furnace 400 (e.g., a header air space adjacent first short end wall 406).

Header air space 558 may also fluidically couple to an array interconnect (e.g., array interconnect 300). For example, in embodiments including two or more solar powered furnaces 400 connected in a parallel reverse return flow configuration, an array interconnect receiver (e.g., first receiver 302a) may be inserted into an orifice formed in first long sidewall 402 at a location which opens into header air space 558. As another example, in an embodiment in which two or more solar powered furnaces 400 are connected in a series flow configuration, an orifice may be formed in second short sidewall 408 and an array interconnect receiver (e.g., first receiver 302a) may be inserted into the orifice to fluidically couple to header air space 558.

Once air enters header air space 558, either through an array interconnect 300 or an air inlet orifice 416, at least some of the air flows through air entryway 560 and into back pass air channel 526, where the air contacts solar absorption plate 518. As solar absorption plate 518 absorbs solar radiation and converts the radiation to heat, at least some of the heat is transferred to air flowing through back pass air channel 526. The heated air then flows to a header air space adjacent first short sidewall 406 and exits solar powered furnace 400 through either an air outlet orifice 418 or an array interconnect 300.

Because air flows through back pass air channel 526 instead of a front pass air channel (i.e. a channel formed between solar absorption plate 518 and glass pane 510), the buildup of dust or other particle contaminants on solar absorption plate 518 may be reduced or eliminated, particularly on the side of solar absorption plate 518 exposed to the sun (the side facing glass pane 510). Any dust or particle buildup on the side of solar absorption plate 518 facing the sun or the glass pane 510 may reduce the absorption efficiency of the absorption plate 518, thus reducing the efficiency of the solar powered furnace 400.

Solar powered furnace 400 includes outer short side insulation 572 adjacent second short sidewall 408 (and similarly, adjacent first short sidewall 406). Similar to outer long side insulation 532, outer short side insulation 572 may include an R-value of greater than about R-8, or greater than or equal to about R-12.

Solar powered furnace 400 further includes an insulation pillar 530, which defines a side of header air space 558. Insulation pillar 530 separates second stagnant air space 528 from header air space 558. Solar powered furnace 400 may include a similar insulation pillar proximate first short sidewall 406 to separate the header air space adjacent first short sidewall 406 from second stagnant air space 528. In some embodiments, solar powered furnace 400 includes a plurality of insulation pillars oriented substantially parallel to insulation pillar 530 and spaced along the length of solar powered furnace 400.

The various components of solar powered furnace 400 may be joined by adhesive or other suitable fasteners. For example, reference numeral 570 illustrates some of the locations at which components of solar powered furnace 400 may be joined by an adhesive. As reference numeral 570 indicates, a top surface of outer short side insulation 572 may be adhered to second short sidewall 408, solar absorption plate 518 may be adhered to outer short side insulation 572, and outer short side insulation 572, inner back insulation 534 and outer back insulation 536 may be adhered to each other and short side inner projection 546.

Figure 6:
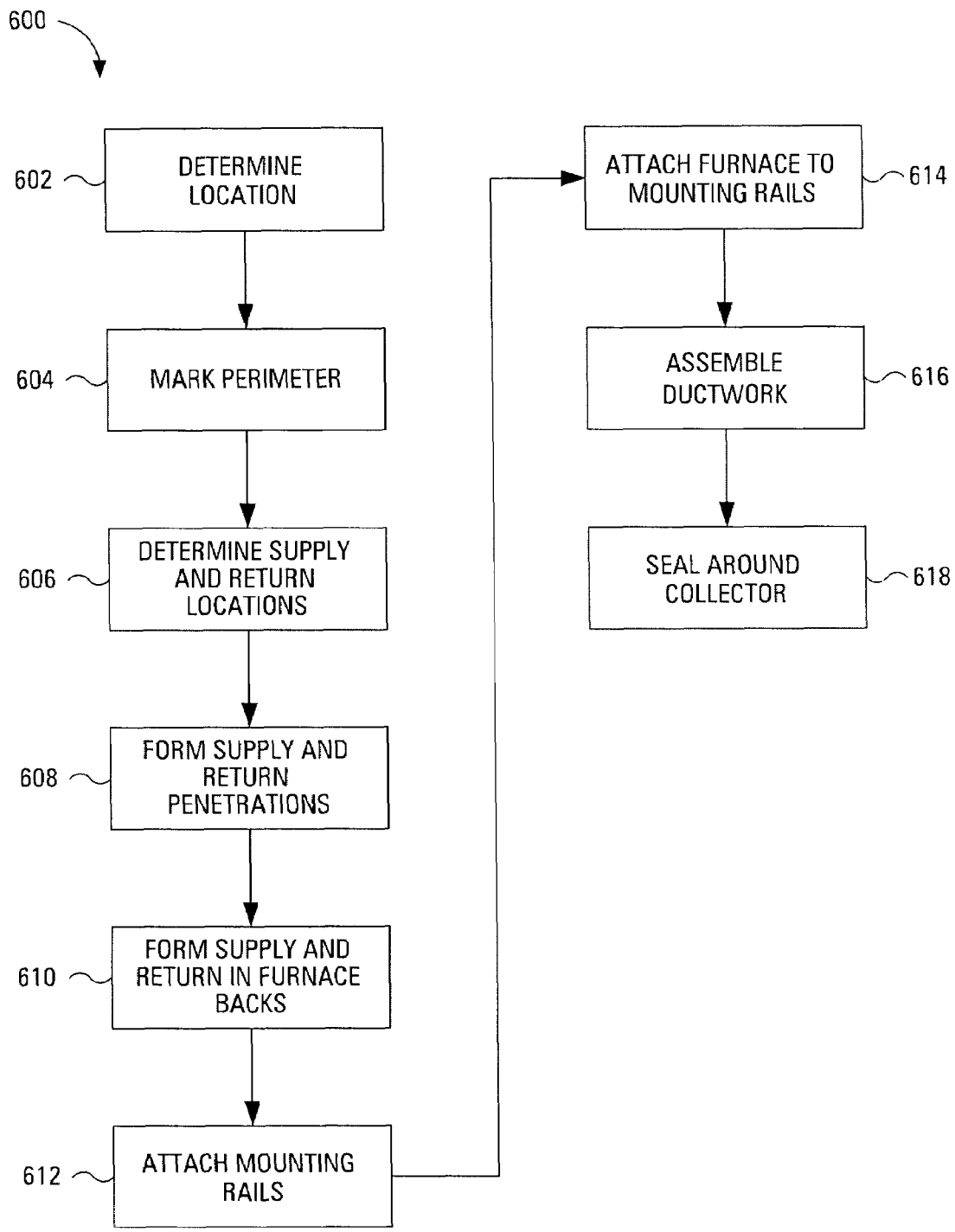
FIG. 6 is a flow chart illustrating an example of a technique for installing a solar powered furnace.

FIG. 6 is a flow chart illustrating an example technique 600 of installing a single solar powered furnace of the present disclosure. Technique 600 will be discussed with reference to a single solar powered furnace 400 of FIGS. 4-5B, but it will be understood that technique 600 may be applied to another solar powered furnace mounted to another type of structure, mounted in another orientation, or mounted to another location of house 500.

First, a location on house 500 suitable for installation of a solar powered furnace 400 is determined (602). The location should include sufficient framing material to which solar powered furnace 400 can be attached. The location should also include sufficient substantially planar area for solar powered furnace 400. For example, solar powered furnace 400 may measure, in some embodiments, approximately 48⅛"× 122⅛", 48⅛"×98⅛", or 48⅛"×80⅛". Accordingly, a minimum area of at least 48⅛"×122⅛", 48⅛"×98⅛", or 48⅛"× 80⅛" is required to mount a solar powered furnace 400 of each respective size.

Next, a perimeter of solar powered furnace 400 is marked on house 500 (604). In some embodiments, the perimeter of solar powered furnace 400 may be indicated on house 500 with a chalk line or another visual indication. The perimeter may vary according to the size of furnace 400, as discussed above.

Locations for supply and return penetrations into house 100 are then determined (606). As discussed in further detail above, it is often desirable to vertically separate air inlet orifice 416 and air outlet orifice 418 as much as possible, as this improves air circulation and heating effectiveness. Also described in further detail above, air inlet and outlet orifices 416 and 418 may be formed in solar powered furnace 400 to open into a header air space 558 on either end of the solar powered furnace 400. For example, the area may measure approximately 20"×44" in a solar powered furnace 400 having a width of approximately 48⅛". The locations for the supply and return penetrations into house 500 should be chosen such that the penetrations are located in an area within the perimeter of solar powered furnace 400 corresponding to the header area of solar powered furnace 400 when furnace 400 is mounted to house 500. The locations for the supply and return penetrations should also be chosen to avoid existing infrastructure of house 500, such as, for example, electrical wired, plumbing, studs or floor joists, or the like.

In some embodiments, the supply and return penetrations may comprise approximately circular orifices in house 500. The supply and return penetrations each may be sized to accept ductwork that fluidically couples the solar powered furnace 400 to room within house 500 and insulation surrounding the ductwork. For example, in some embodiments, a 6 inch diameter duct may be used and the supply and return penetrations may comprise a 9 inch diameter to accommodate insulation surrounding the 6 inch duct. As another example, an 8 inch duct may be used and the supply and return penetrations may comprise a 12½ inch to 13 inch diameter to accommodate insulation surrounding the 8 inch duct. Once suitable locations for the supply and return penetrations have been determined, the supply and return penetrations are formed in house 500 (608). The supply and return penetrations may be formed in house 500 using a hole saw or another cutting tool, such as, for example, a reciprocating saw. The interior opening of the supply and return penetrations should be trimmed with a vent grille or a fan box.

Once suitable locations for the supply and return penetrations have been formed, corresponding locations of air inlet orifice 416 and air outlet orifice 418 may be determined and formed (610) in the back of solar powered furnace 400 (e.g., in outer back sheet insulation 536 and inner back sheet insulation 534). The locations of air inlet orifice 416 and air outlet orifice 418 may be determined by measuring the distance from one or more of the perimeter lines of solar powered furnace 400 marked on house 500 to the center of the respective supply penetration and return penetration. These distances may then be measured from the corresponding one or more edges of solar powered furnace 400, and the respective air inlet orifice 416 or air outlet orifice 418 formed through outer back sheet insulation 536 and inner back sheet insulation 534 and into header air space 558.

In other embodiments, air inlet orifice 416 and air outlet orifice 418 may be formed through outer back sheet insulation 536 and inner back sheet insulation 534 after solar powered furnace 400 is mounted to house 500. Forming air inlet orifice 416 and air outlet orifice 418 after furnace 400 is mounted to house 500 may facilitate the alignment of air inlet orifice 416 with the supply penetration and air outlet orifice 418 with the return penetration. However, forming air inlet orifice 416 and air outlet orifice 418 at this time may also require forming a larger diameter supply penetration and return penetration to provide sufficient work space for forming air inlet orifice 416 and air outlet orifice 418.

Next, mounting rail(s) 564 are attached to house 500 (612). Mounting rail(s) 564 may comprise hollow aluminum rectangular tubing, and in some embodiments, may have a cross-section of 1 inch by 2 inches. It is generally preferred that mounting rail(s) 564 are attached to house 500 horizontally, but in some embodiments, mounting rail(s) 564 may be attached to house 500 vertically. Mounting rail(s) 564 are securely fastened to house 500 by, for example, stainless steel lag bolts.

The fasteners may be inserted into mounting rail 564 in one of two ways. For example, a two part step drill may be used, in which a larger hole is drilled in the side of mounting rail 564 away from house 500, while a smaller hole is drilled in the side of mounting rail 564 adjacent house 500. In other examples, pilot holes may be drilled in both sides of mounting rail 564, followed by enlarging the hole in the side of mounting rail 564 away from house 500. The fastener is then used to attach mounting rail 564 to house 500.

Once mounting rail(s) 564 are attached to house 500, solar powered furnace 400 is mounted to house 500 by way of mounting rail(s) 564 (614). Solar powered furnace 400 is placed over each of mounting rail(s) 564, and a plurality of fasteners 568 are used to attach furnace 400 to each mounting rail 564. In some embodiments, fasteners 568 include self-drilling screws. In some embodiments, at least 7 fasteners are used to attach furnace 400 to each mounting rail 564.

Next, ductwork is assembled to fluidically couple air inlet orifice 416 and air outlet orifice 418 to the room or rooms within house 500 (616). The ductwork may include a starter collar with a diameter of between about 4 inches and 12 inches, a backdraft damper, snap disc high temperature leads, and depending on the depth of the wall of house 500, a section of ducting. The starter collar is attached to back surface 410 of solar powered furnace 400 using aluminum foil tape or anther high temperature tape. The backdraft damper, which functions as a check valve and prevents airflow in the incorrect direction (e.g., airflow out air inlet orifice 416 or airflow in air outlet orifice 418), is attached to the starter collar.

The snap disc high temperature leads are run through a conduit connector to the outside of the duct work, where the leads are taped to the ducting stent. The snap disc high temperature leads connect to snap discs, which sense whether there is useful heat to harvest in solar powered furnace 400. The snap disc high temperature leads connect the snap discs to a thermostat, which controls operation of solar powered furnace 400 based on the snap disc and a signal from a thermostat within house 500. For example, when the snap disc senses available heat in solar powered furnace 400 and the thermostat indicates that heating is needed in house 500, solar powered furnace 400 is activated and air is exchanged between house 500 and solar powered furnace 400. When the snap disc sensed there is no available heat in solar powered furnace 400, the system is inactive.

The ductwork is covered with high temperature insulation to protect the wall of house 500 from heated air. In other embodiments, assembly of the ductwork may be performed prior to mounting the solar powered furnace 400 to mounting rail(s) 564.

Finally, a seal is formed around solar powered furnace 400 (618). The seal may include caulking appropriate for the climate. In some embodiments, flashing may also be installed around solar powered furnace 400 to further protect furnace 400 and the area of house 500 around furnace 400 from weather, such as rain or snow. The flashing may be applied over the approximately the top third of solar powered furnace 400, and may be formed of aluminum. In other embodiments, a drip edge may be installed over the top of solar powered furnace 400.

Figure 7:
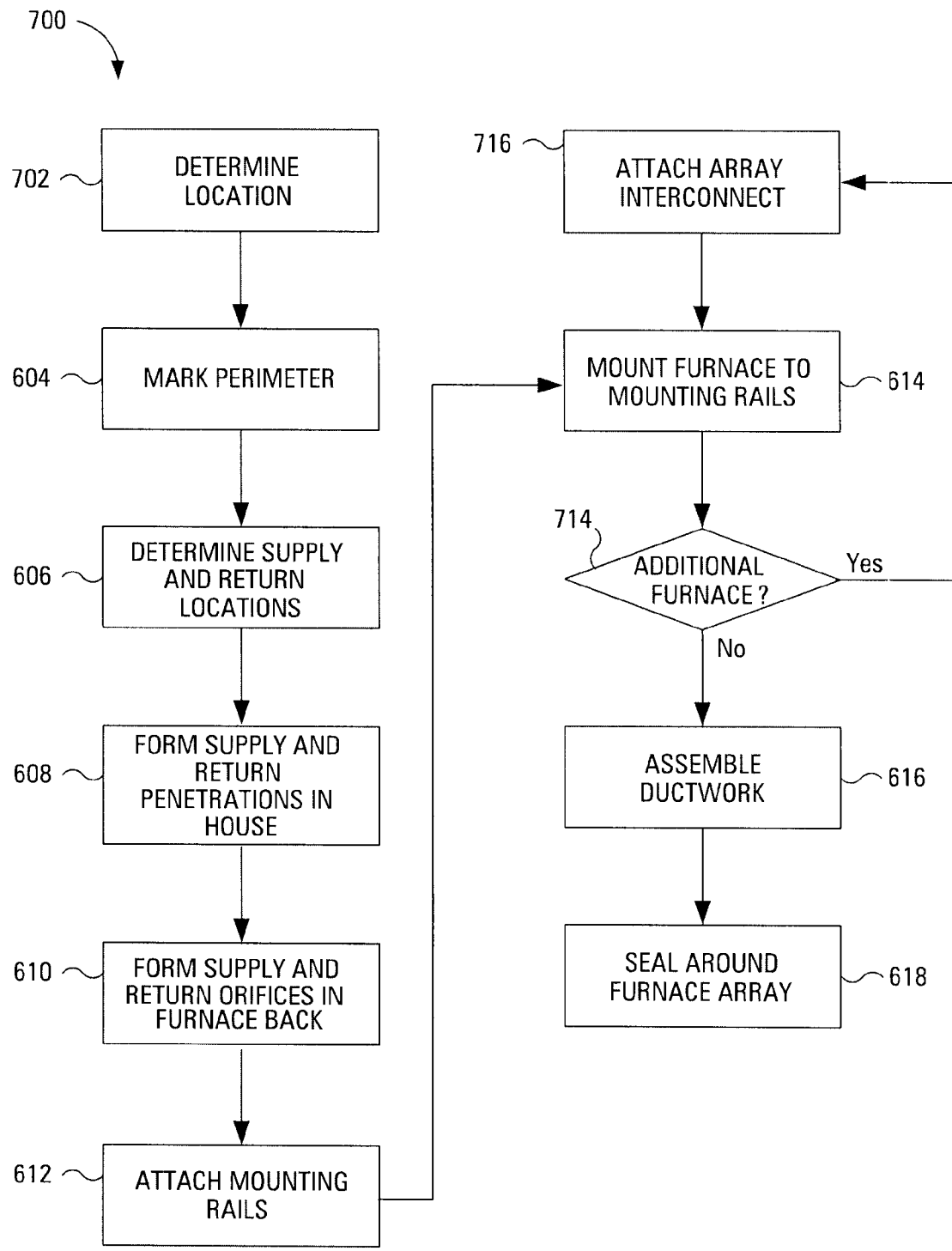
FIG. 7 is a flow chart illustrating an example of a technique for installing a solar powered furnace array.

FIG. 7 illustrates an example technique for installing a solar powered furnace array including more than one solar powered furnace 400. The initial steps are similar to those for installing a single solar powered furnace 400. First, the location at which the solar powered furnace array is to be mounted to house 500 is determined (702), which includes determining the number of solar powered furnaces 400 in the array. Next, the perimeter of the array is marked on house 500 (604), and the supply and return locations are determined (604). The supply and return penetrations are then formed in the side of the structure (608) and the corresponding air inlet and outlet orifices 416 and 418 are formed in the corresponding solar powered furnaces 400 (610).

Mounting rails 514 are then attached to the structure (612). In some embodiments, mounting rails 514 are sufficiently long to mount all of the furnaces 400 in the array to the house. In other embodiments, each of furnaces 400 in the array is mounted to one or more mounting rails 514 that mount only that furnace 400. Once the first solar powered furnace 400 is mounted to mounting rails 514 (614), it is determined whether an additional solar powered furnace 400 is to be installed in the array (714). When an additional solar powered furnace 400 is to be installed in the array, an array interconnect stent (e.g., array interconnect stent 304) is then inserted in an array interconnect receiver (e.g., first receiver 302a) inserted in a port (e.g., first parallel port 412a) in the first solar powered furnace 400 (714).

Once stent 304 is inserted in the receiver 302b, the second solar powered furnace 400 is positioned over mounting rails 564 and is manipulated to insert stent 304 in a receiver 302b located in a parallel port 412a in the second solar powered furnace 400. The second solar powered furnace 400 is then mounted to mounting rails 564 using appropriate fasteners, as described above (614). While fasteners 568 are being inserted into the second solar powered furnace 400 and mounting rails 564, the second solar powered furnace 400 is held tightly against the first solar powered furnace 400 so that a projection 504 of the first solar powered furnace 400 butts against a projection 504 on the second solar powered furnace 400, forming a substantially flush surface. The flush surface improves the aesthetic qualities of the solar powered furnace array, and also contributes to weather resistance of the array.

Once the second solar powered furnace 400 is mounted to mounting rails 564, it is determined whether the solar powered furnace array includes a third solar powered furnace 400 (714). If so, the third solar powered furnace 400 is installed following the same procedure as the second solar powered furnace 400. Once it is determined that all solar powered furnaces have been installed, the ductwork is assembled (616), as described above, and a seal is formed around the solar powered furnace array (618).

In some embodiments, the installation steps may be performed in a different order. For example, the ducting stent for the first solar powered furnace 400 may be assembled (616) prior to mounting the first solar powered furnace 400, while the ducting stent for the solar powered furnace 400 to be mounting last may be assembled following mounting the last solar powered furnace 400 to the mounting rails (614). Other installation step sequences will be apparent to those of skill in the art and fall within the scope of the disclosure and claims.

EXAMPLES

Example 1

Figure 8:
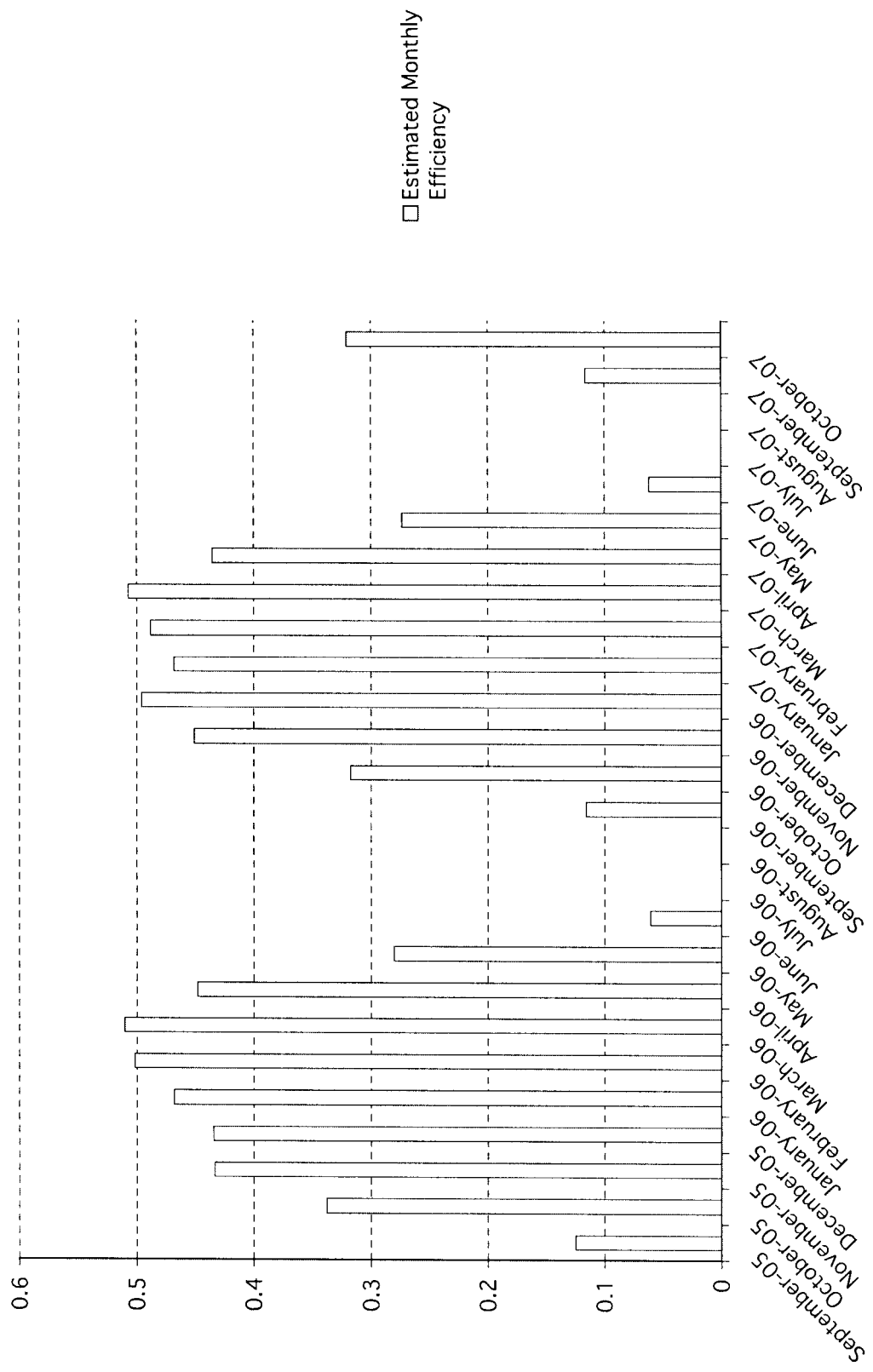
FIG. 8 is a bar graph illustrating calculated monthly efficiencies for an example of a solar powered furnace.

The efficiency of a solar powered furnace according to the present disclosure, when used in a home heating system, was calculated for each month from September 2005 to October 2007 based on real-world data according to calculations described by J. A. Duffie and W. A. Beckman in *Solar Engineering of Thermal Processes, 3rd Edition,* New York: Wiley-Interscience, 2006. FIG. 8 is a bar graph of the calculated monthly efficiencies for an example solar powered furnace. The calculated efficiencies are exemplary and are intended to represent efficiencies that may be achieved when a solar powered furnace of the present disclosure is used in a home heating application. As described herein, the solar powered furnace may be used in other applications, such as, for example, an agricultural commodity drying system. The efficiency achieved by a solar powered furnace of the current disclosure when used in these other application may be different from the efficiency of a solar powered furnace used in a home heating application, and in some embodiments, may be greater than the efficiencies illustrated in Example 1.

Various embodiments of the invention have been described. These and other embodiments are within the scope of the following claims.

The invention claimed is:

1. A solar powered furnace array comprising:
a first solar powered furnace comprising a first sidewall, a second sidewall substantially opposite and parallel to the first sidewall, a third sidewall, and a fourth sidewall substantially opposite and parallel to the third sidewall, wherein the first sidewall defines a first port;
a second solar powered furnace comprising a fifth sidewall, a sixth sidewall substantially opposite and parallel to the fifth sidewall, a seventh sidewall, and an eighth sidewall substantially opposite and parallel to the seventh sidewall, wherein the fifth sidewall defines a second port;
an array interconnect comprising:
a first receiver at least partially inserted in the first port, wherein the first receiver comprises a first receiver outer surface, a first receiver inner surface, a first lip extending substantially normal outward from the first receiver outer surface, and a second lip extending substantially normal inward from the first receiver inner surface, and wherein a surface of the first lip contacts the first sidewall to form a seal between the first receiver and the first sidewall;
a second receiver at least partially inserted in the second port, wherein the second receiver comprises a second receiver outer surface, a second receiver inner surface, a first lip extending substantially normal outward from the second receiver outer surface, and a second lip extending substantially normal inward from the second receiver inner surface, and wherein a surface of the second lip contacts the fifth sidewall to form a seal between the second receiver and the second sidewall; and
an array interconnect stent at least partially inserted in each of the first receiver and the second receiver to fluidically couple the first solar powered furnace and the second solar powered furnace, wherein the second lip of the first receiver contacts a first edge of the array interconnect stent to form a seal between the first receiver and the array interconnect stent, wherein the second lip of the second receiver contacts a second edge of the array interconnect stent to form a seal between the second receiver and the array interconnect stent, and wherein the array interconnect stent comprises at least one cross support that helps maintain the shape of the array interconnect stent to create contact between an outer surface of the array interconnect stent and the first receiver inner surface and between the outer surface of the array interconnect stent and the second receiver inner surface.

2. The solar powered furnace array of claim 1, wherein at least one of the first receiver and the second receiver further comprises a flexible overhang, and wherein the array interconnect stent contacts the overhang to form a seal between the array interconnect stent and the at least one of the first receiver and the second receiver.

3. The solar powered furnace array of claim 1, wherein the first sidewall is connected to the third and fourth sidewalls, wherein the second sidewall is connected to the third and fourth sidewalls, wherein the first and second sidewalls are shorter than the third and fourth sidewalls, wherein the fifth sidewall is connected to the seventh and eight sidewalls, wherein the sixth sidewall is connected to the seventh and eighth sidewalls, wherein the fifth and sixth sidewalls are shorter than the seventh and eighth sidewalls, and wherein the array interconnect fluidically couples the first solar powered furnace and the second solar powered furnace in a series flow configuration.

4. The solar powered furnace array of claim 1, wherein the first sidewall further defines a third port, and wherein the fifth sidewall further defines a fourth port, and wherein the array interconnect is a first array interconnect and the solar powered furnace array further comprises a second array interconnect comprising:
a third receiver at least partially inserted in the third port;
a fourth receiver at least partially inserted in the fourth port; and
a second array interconnect stent at least partially inserted in each of the third receiver and the fourth receiver to fluidically couple the first solar powered furnace and the second solar powered furnace.

5. The solar powered furnace array of claim 4, wherein the first sidewall is connected to the third and fourth sidewalls, wherein the second sidewall is connected to the third and fourth sidewalls, wherein the first and second sidewalls are shorter than the third and fourth sidewalls, wherein the fifth sidewall is connected to the seventh and eight sidewalls, wherein the sixth sidewall is connected to the seventh and eighth sidewalls, wherein the fifth and sixth sidewalls are shorter than the seventh and eighth sidewalls, and wherein the first and second array interconnects fluidically couple the first solar powered furnace and the second solar powered furnace in a series flow configuration.

6. The solar powered furnace array of claim 1, wherein the first sidewall comprises a first projection, wherein the fifth sidewall comprises a second projection, and wherein, when the first solar powered furnace is fluidically coupled to the second solar powered furnace, the first projection is substantially flush with the second projection.

7. The solar powered furnace array of claim 1, further comprising a bead of caulk forming a seal between the first receiver, the second receiver, and the array interconnect stent.

8. The solar powered furnace array of claim 1,
wherein the first solar powered furnace comprises:
   a first header air space adjacent to the first sidewall;
   a second header air space adjacent to the second sidewall;
   a first solar absorption plate;
   a first duct floor; and
   a first back pass air channel defined between the first solar absorption plate and the first duct floor, wherein the first back pass air channel is fluidically coupled between the first header air space and second header air space, and wherein the first receiver extends into the first header air space; and
wherein the second solar powered furnace comprises
   a third header air space adjacent to the fifth sidewall;
   a fourth header air space adjacent to the sixth sidewall;
   a second solar absorption plate;
   a first duct floor; and
   a second back pass air channel defined between the second solar absorption plate and the second duct floor, wherein the second back pass air channel is fluidically coupled between the third header air space and fourth header air space, and wherein the second receiver extends into the third header air space.

9. A method comprising:
inserting an array interconnect stent in a first receiver, wherein the first receiver is at least partially disposed in a first port in a first sidewall of a first solar powered furnace, and wherein the first receiver comprises a first receiver outer surface, a first receiver inner surface, a first lip extending substantially normal outward from the first receiver outer surface, and a second lip extending substantially normal inward from the first receiver inner surface, and wherein a surface of the first lip contacts the first sidewall to form a seal between the first receiver and the first sidewall; and
inserting the array interconnect stent in a second receiver, wherein the second receiver is at least partially disposed in a second port in a second sidewall of a second solar powered furnace, wherein the second receiver comprises a second receiver outer surface, a second receiver inner surface, a first lip extending substantially normal outward from the second receiver outer surface, and a second lip extending substantially normal inward from the receiver inner surface, wherein a surface of the first lip contacts the second sidewall to form a seal between the second receiver and the second sidewall, and wherein the array interconnect stent fluidically couples the first solar powered furnace and the second solar powered furnace, and wherein the array interconnect stent comprises at least one cross support that helps maintain the shape of the array interconnect stent to create contact between an outer surface of the array interconnect stent and the first receiver inner surface and between the outer surface of the array interconnect stent and the second receiver inner surface.

10. The method of claim 9, further wherein at least one of the first receiver and the second receiver further comprises a flexible overhang, and wherein the array interconnect stent contacts the overhang to form a seal between the array interconnect stent and the at least one of the first receiver and the second receiver.

11. The method of claim 9, further comprising:
forming the first port in the first sidewall of the first solar powered furnace; and
forming the second port in the second sidewall of the second solar powered furnace.

12. The method of claim 9, wherein the array interconnect stent comprises a first array interconnect stent, the method further comprising:
inserting a second array interconnect stent in a third receiver, wherein the third receiver is at least partially disposed in a third port in the first sidewall of the first solar powered furnace, and wherein the third receiver comprises a third receiver outer surface, a third receiver inner surface, a first lip extending substantially normal outward from the third receiver outer surface, and a second lip extending substantially normal inward from the third receiver inner surface, and wherein a surface of the first lip contacts the first sidewall to form a seal between the third receiver and the first sidewall; and
inserting the second array interconnect stent in a fourth receiver, wherein the fourth receiver is at least partially disposed in a fourth port in the second sidewall of the second solar powered furnace, wherein the fourth receiver comprises a fourth receiver outer surface, a fourth receiver inner surface, a first lip extending substantially normal outward from the fourth receiver outer surface, and a second lip extending substantially normal inward from the fourth receiver inner surface, and wherein a surface of the first lip contacts the second sidewall to form a seal between the fourth receiver and the second sidewall, and wherein the second array interconnect stent fluidically couples the first solar powered furnace and the second solar powered furnace.

13. The method of claim 9,
wherein the first solar powered furnace comprises:
   a first header air space adjacent to the first sidewall;
   a second header air space adjacent to the second sidewall;
   a first solar absorption plate;
   a first duct floor; and
   a first back pass air channel defined between the first solar absorption plate and the first duct floor, wherein the first back pass air channel is fluidically coupled between the first header air space and second header air space, and wherein the first receiver extends into the first header air space; and
wherein the second solar powered furnace comprises
   a third header air space adjacent to the fifth sidewall;
   a fourth header air space adjacent to the sixth sidewall;
   a second solar absorption plate;
   a first duct floor; and
   a second back pass air channel defined between the second solar absorption plate and the second duct floor, wherein the second back pass air channel is fluidically coupled between the third header air space and fourth header air space, and wherein the second receiver extends into the third header air space.

14. The solar powered furnace array of claim 1,
wherein the first sidewall is connected to the third and fourth sidewalls, wherein the second sidewall is connected to the third and fourth sidewalls;
wherein the first and second sidewalls are longer than the third and fourth sidewalls;
wherein the fifth sidewall is connected to the seventh and eight sidewalls;
wherein the sixth sidewall is connected to the seventh and eighth sidewalls;
wherein the fifth and sixth sidewalls are longer than the seventh and eighth sidewalls;
wherein the first sidewall further defines a third port;
wherein the fifth sidewall further defines a fourth port;
wherein the array interconnect is a first array interconnect and the solar powered furnace array further comprises a second array interconnect comprising:
  a third receiver at least partially inserted in the third port,
  a fourth receiver at least partially inserted in the fourth port, and
  a second array interconnect stent at least partially inserted in each of the third receiver and the fourth receiver to fluidically couple the first solar powered furnace and the second solar powered furnace;
wherein the first solar powered furnace further comprises:
  a first header air space adjacent to the third sidewall,
  a second header air space adjacent to the fourth sidewall,
  a first solar absorption plate,
  a first duct floor, and
  a first back pass air channel defined between the first solar absorption plate and the first duct floor, the first back pass air channel being fluidically coupled between the first header air space and second header air space, the first receiver extending into the first header air space, and the third receiver extending into the second header air space;
wherein the second solar powered furnace comprises:
  a third header air space adjacent to the seventh sidewall;
  a fourth header air space adjacent to the eighth sidewall;
  a second solar absorption plate;
  a first duct floor; and
  a second back pass air channel defined between the second solar absorption plate and the second duct floor, the second back pass air channel being fluidically coupled between the third header air space and fourth header air space, wherein the second receiver extends into the third header air space, and wherein the fourth receiver extends into the fourth header air space; and
wherein air flows through the first back pass air channel and the second back pass air channel in a parallel flow configuration.

* * * * *